(12) United States Patent
Zhou et al.

(10) Patent No.: US 10,873,386 B2
(45) Date of Patent: Dec. 22, 2020

(54) SIGNALING OF UE INTRA/INTER-PANEL BEAM SWITCH LATENCY

(71) Applicant: QUALCOMM Incorporated, San Diego, CA (US)

(72) Inventors: Yan Zhou, San Diego, CA (US); Tao Luo, San Diego, CA (US); Valentin Alexandru Gheorghiu, Tokyo (JP); Ruhua He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/259,188

(22) Filed: Jan. 28, 2019

(65) Prior Publication Data

US 2019/0260458 A1 Aug. 22, 2019

Related U.S. Application Data

(60) Provisional application No. 62/633,566, filed on Feb. 21, 2018.

(51) Int. Cl.
| | | |
|---|---|---|
| *H04B 7/02* | (2018.01) | |
| *H04B 7/08* | (2006.01) | |
| *H04B 7/06* | (2006.01) | |
| *H04W 72/04* | (2009.01) | |
| *H04W 72/08* | (2009.01) | |
| *H04W 52/02* | (2009.01) | |
| *H04L 5/00* | (2006.01) | |
| *H04B 7/022* | (2017.01) | |
| *H04B 7/0417* | (2017.01) | |

(52) U.S. Cl.
CPC .......... *H04B 7/088* (2013.01); *H04B 7/0626* (2013.01); *H04B 7/0695* (2013.01);
(Continued)

(58) Field of Classification Search
CPC .... H04B 7/088; H04B 7/0626; H04B 7/0695; H04B 7/0805; H04B 7/0877;
(Continued)

(56) References Cited

U.S. PATENT DOCUMENTS

2017/0251518 A1* 8/2017 Agiwal ................. H04W 76/28
2019/0052331 A1* 2/2019 Chang .................. H04B 7/0619

FOREIGN PATENT DOCUMENTS

WO WO-2018034713 A1 * 2/2018 ........... H04B 7/0421

OTHER PUBLICATIONS

Ericsson: "UL Multi-Panel Transmission", 3GPP Draft, R1-1711012 UL_Multipanel_Transmission, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051300212, 4 Pages, Retrieved from the Internet:URL:http://www.3gpp.org/ftp/Meetings_3GPP_SYNC/RAN1/Docs/ [retrieved on Jun. 26, 2017].

(Continued)

*Primary Examiner* — Zewdu A Kassa
(74) *Attorney, Agent, or Firm* — Qualcomm Incorporated

(57) ABSTRACT

Certain aspects of the present disclosure relate to methods and apparatus for signaling of UE intra/inter-panel beam switch latency using communications systems operating according to new radio (NR) technologies. For example, the method generally includes determining at least a first latency associated with a beam switch across at least first and second antenna array modules, wherein the first latency is greater than or equal to a second latency associated with a beam switch within the first or second antenna module, and signaling a second device an indication of when to assume the first latency for a beam switch at the first device.

29 Claims, 18 Drawing Sheets

(52) U.S. Cl.
CPC ......... *H04B 7/0805* (2013.01); *H04B 7/0877* (2013.01); *H04L 5/0053* (2013.01); *H04W 52/028* (2013.01); *H04W 52/0229* (2013.01); *H04W 72/0406* (2013.01); *H04W 72/046* (2013.01); *H04W 72/085* (2013.01); *H04B 7/022* (2013.01); *H04B 7/0417* (2013.01); *H04L 5/005* (2013.01); *H04L 5/0023* (2013.01); *H04L 5/0048* (2013.01)

(58) Field of Classification Search
CPC ............ H04L 5/0053; H04W 52/0229; H04W 52/028; H04W 72/0406; H04W 72/046; H04W 72/085
USPC ................ 375/267, 265, 259, 316, 295, 219
See application file for complete search history.

(56) References Cited

OTHER PUBLICATIONS

Intel Corporation: "On Network Beam Switching and Refinement (BM P-2)", 3GPP Draft, R1-1609515 NW Beam Refinement_V9, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051149554, 7 Pages, Retrieved from the Internet: URL:http://www.3gpp.org/ftp/Meetings_3GPP_SYNC/RAN1/Docs/ [retrieved on Oct. 9, 2016]. pp. 1,5.
International Search Report and Written Opinion—PCT/US2019/015635—ISA/EPO—dated Apr. 17, 2017.
QUALCOMM Incorporated: "Beam Management for NR", 3GPP Draft, R1-1807341 Beam Management for NR, 3rd Generation Partnership Project (3GPP),Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442533, 11 Pages, Retrieved from the Internet:URL:http://www.3gpp.org/ftp/Meetings%5F3GPP%5FSYNC/RAN1/Docs/ [retrieved on May 20, 2018], p. 1, Section 3.
QUALCOMM Incorporated: "Remaining Details on QCL", 3GPP Draft; R1-1800867, 3rd Generation Patnership Project (3GPP), Mobile Competence Centre, 650, Route Des Lucioles ; F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051385137, pp. 1-8, Retrieved from the Internet: URL: http://www.3gpp.org/ftp/tsg_ran/WG1_RL1/TSGR1_AH/NR_AH_1801/Docs/ [retrieved on Jan. 13, 2018], Section 2.1.2.

* cited by examiner

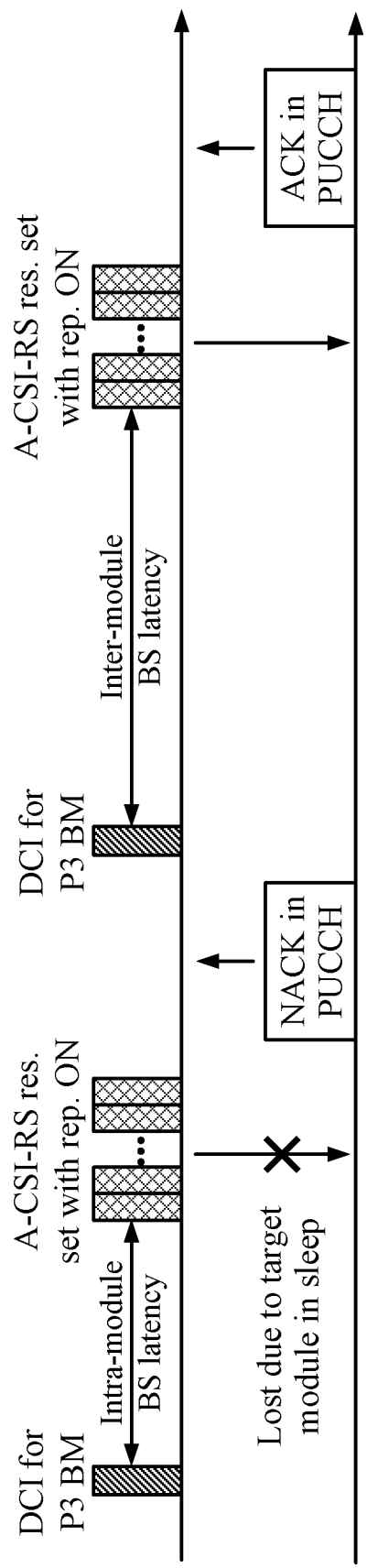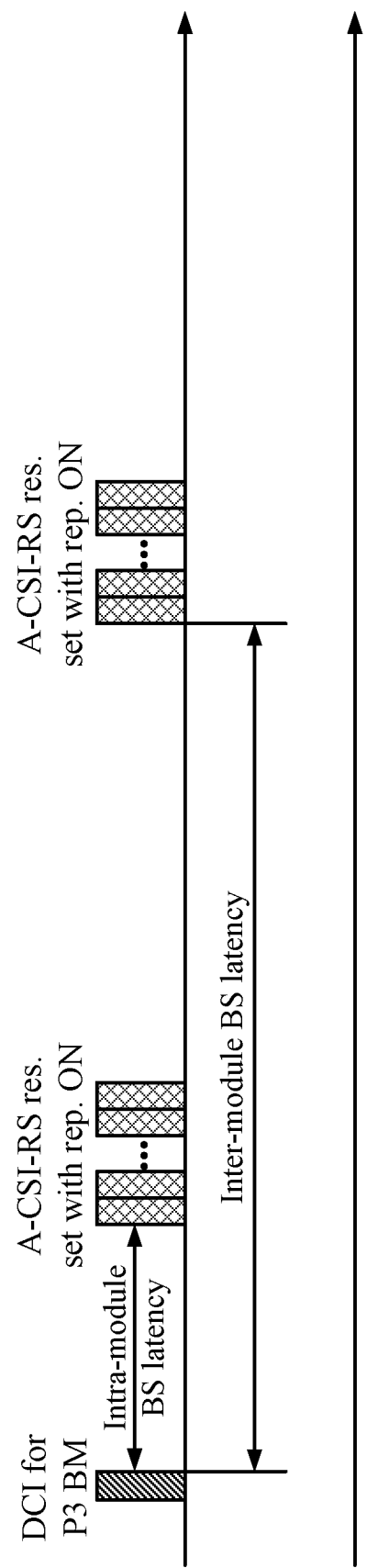
FIG. 13
FIG. 14

|  | Active TCI state 1 | ... | Active TCI state Y |
|---|---|---|---|
| CORESET 1 | 0 or 1 | ... | 0 or 1 |
| ... | ... | ... | ... |
| CORESET X | 0 or 1 | ... | 0 or 1 |

FIG. 17

SIGNALING OF UE INTRA/INTER-PANEL BEAM SWITCH LATENCY

CLAIM OF PRIORITY UNDER 35 U.S.C. § 119

The present application for patent claims benefit of U.S. Provisional Patent Application Ser. No. 62/633,566, filed Feb. 21, 2018, assigned to the assignee hereof and hereby expressly incorporated by reference herein.

BACKGROUND

Field of the Disclosure

The present disclosure relates generally to communication systems, and more particularly, to methods and apparatus for signaling of UE intra/inter-panel beam switch latency using communications systems operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a first device. The method generally includes determining at least a first latency associated with a beam switch across at least first and second antenna array modules, wherein the first latency is greater than or equal to a second latency associated with a beam switch within the first or second antenna module. The method may further include signaling, to a second device, an indication of when to assume the first latency for a beam switch at the first device.

Certain aspects provide a method for wireless communication by a first device. The method generally includes receiving signaling indicating a first latency associated with a beam switch across at least first and second antenna array modules at a second device, wherein the first latency is greater than or equal to a second latency associated with a beam switch within the first or second antenna module. The method may further include determining, based on the signaling, when to assume the first latency for a beam switch at the second device.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 13 illustrates an example of signaling of inter-module beam switch latency for P3 BM, in accordance with aspects of the present disclosure.

FIG. 14 illustrates an example of signaling of inter-module beam switch latency for P3 BM, in accordance with aspects of the present disclosure.

FIG. 17 illustrates a table that indicates whether a beam switch is intra/inter-module for specific combinations of control resource sets (CORESETs) and active TCI states, in accordance with aspects of the present disclosure.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
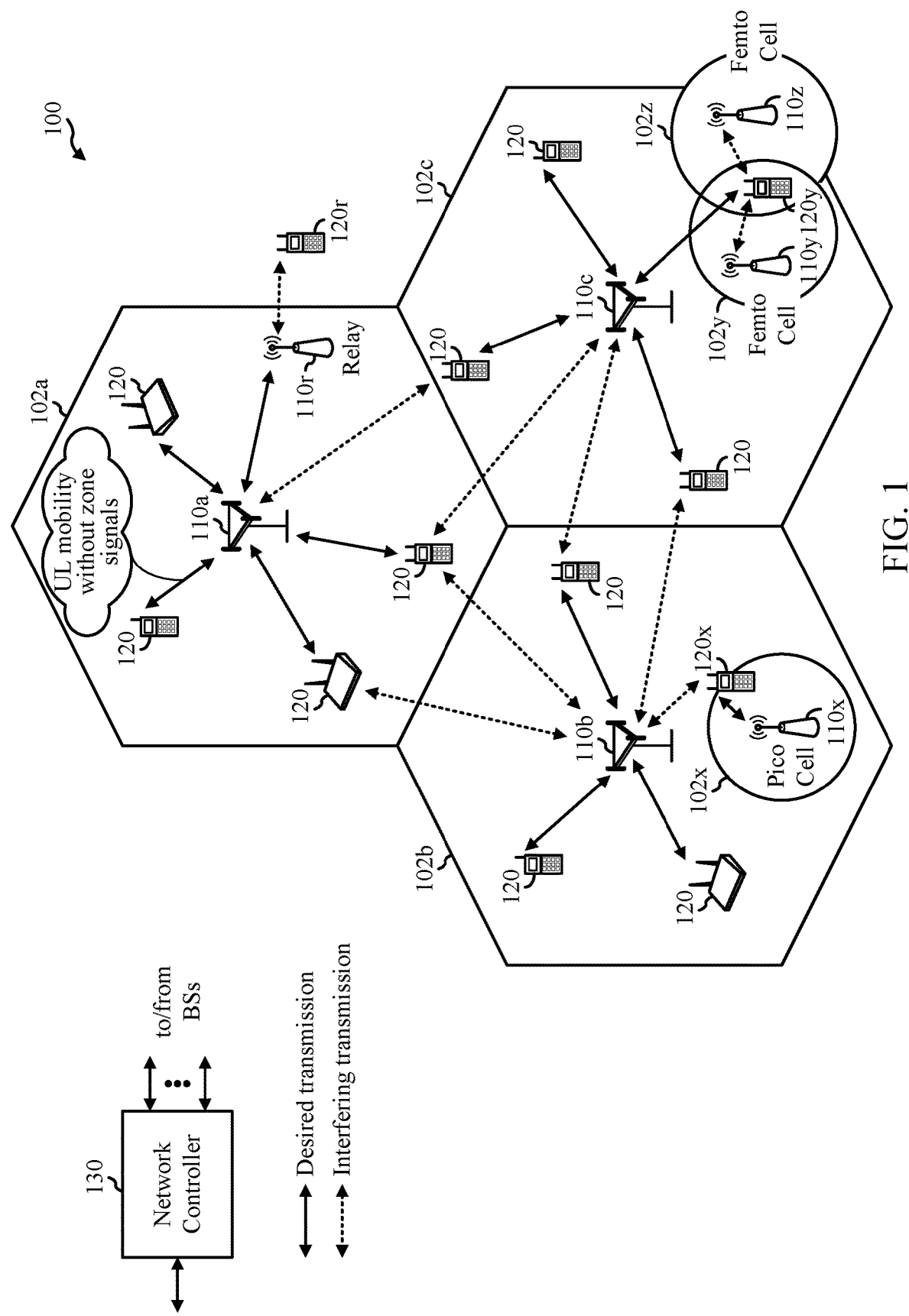
FIG. 1 is a block diagram conceptually illustrating an example telecommunications system, in which aspects of the present disclosure may be performed.

Aspects of the present disclosure provide apparatus, methods, processing systems, and computer readable mediums for NR (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive machine-type communication (mMTC) targeting non-backward compatible machine-type communication (MTC) techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). New Radio (NR) (e.g., 5G radio access) is an example of an emerging telecommunication standard. NR is a set of enhancements to the LTE mobile standard promulgated by 3GPP. "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16 . . . slots) depending on the tone-spacing (e.g., 15, 30, 60, 120, 240 . . . kHz). NR may utilize OFDM with a CP on the uplink and downlink and include support for half-duplex operation using time division duplex (TDD). A single component carrier bandwidth of 100 MHz may be supported. NR resource blocks may span 12 subcarriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include downlink/uplink (DL/UL) data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit synchronization signal (SS). NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
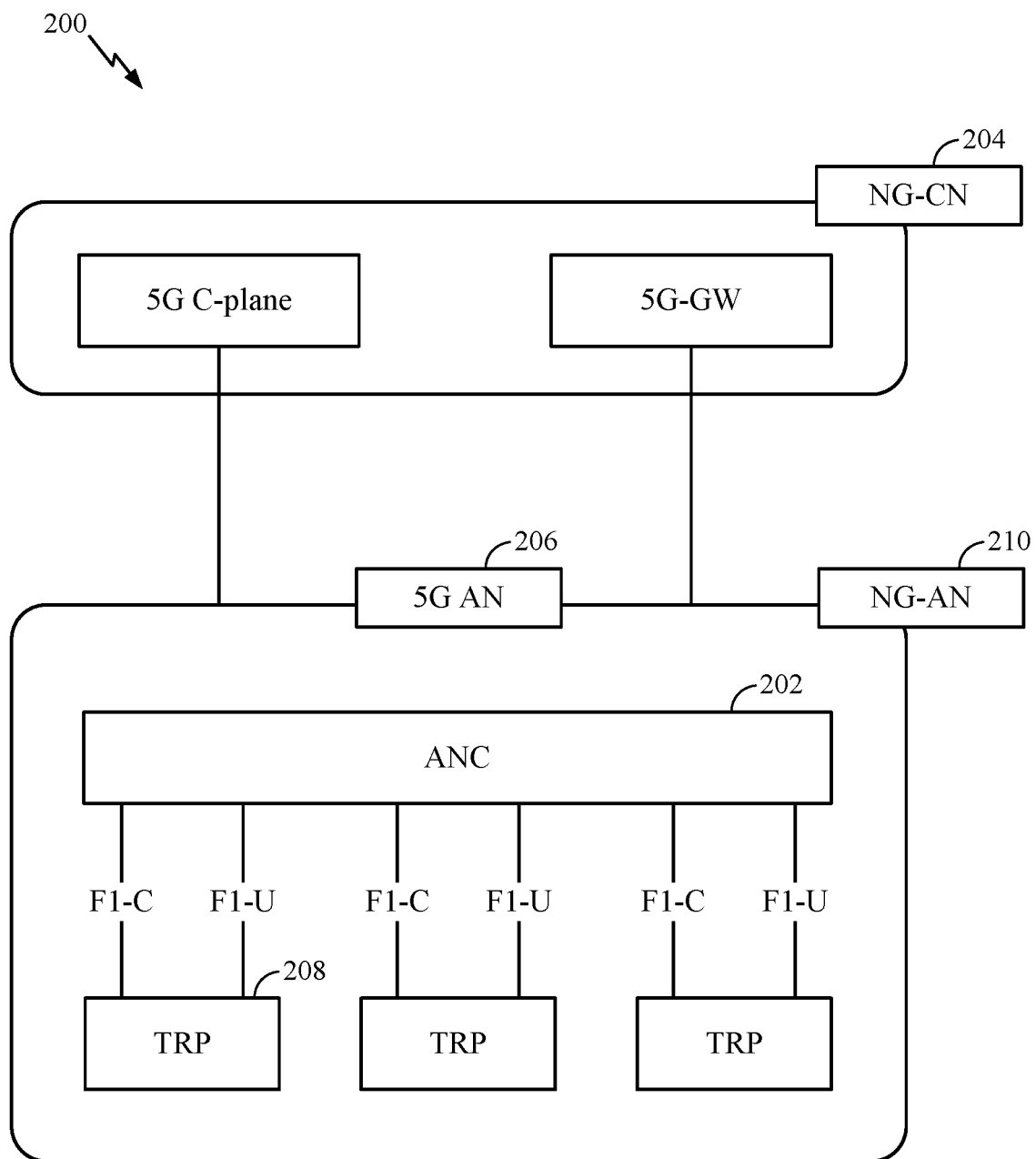
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
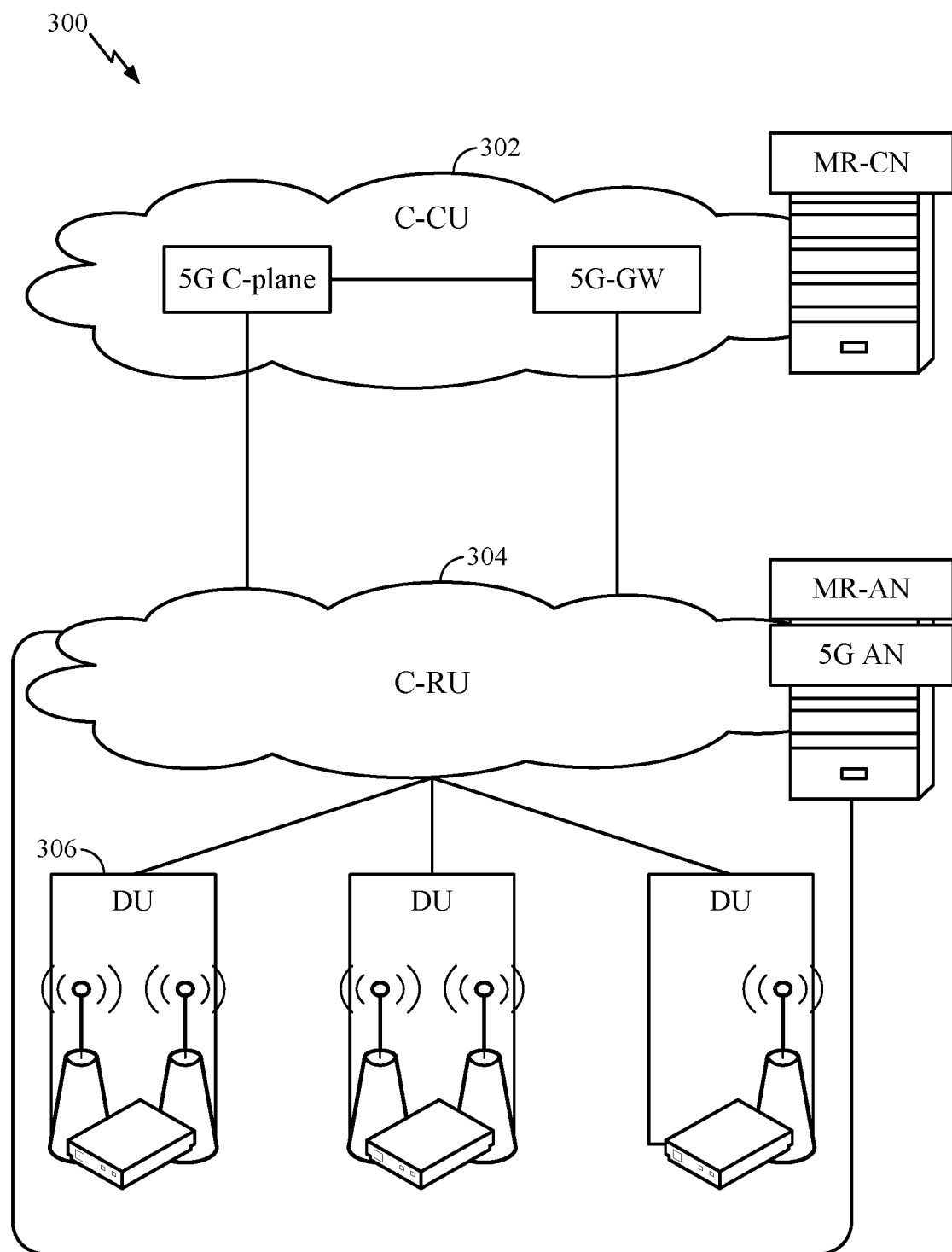
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
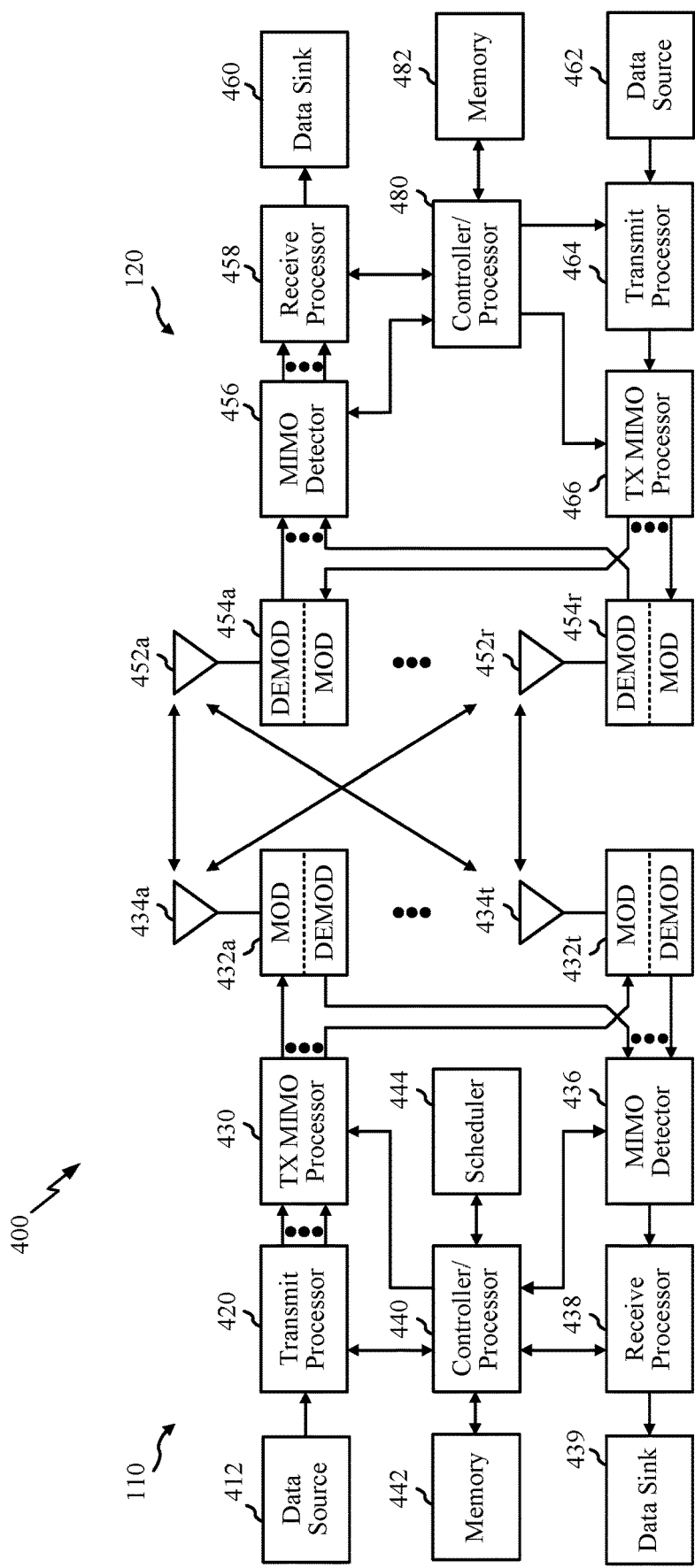
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, MOD/DEMOD 454, processors 466, 458, 464, and/or controller/processor 480 of the UE 120 and/or antennas 434, MOD/DEMOD 432, processors 430, 420, 438, and/or controller/processor 440 of the BS 110 may be used to perform the operations described herein and illustrated with reference to FIGS. 9 and 10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
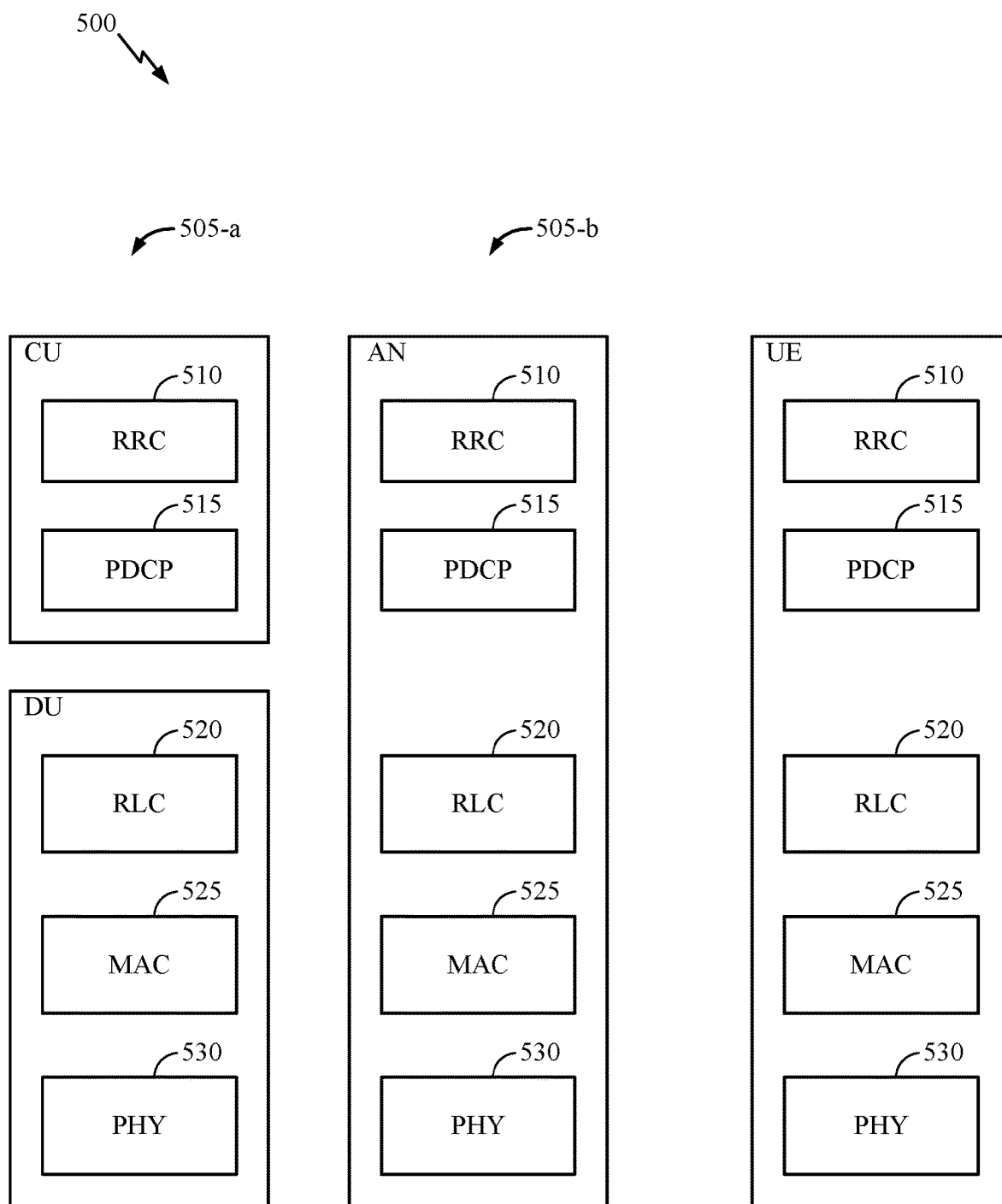
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or application specific integrated circuit (ASIC), portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
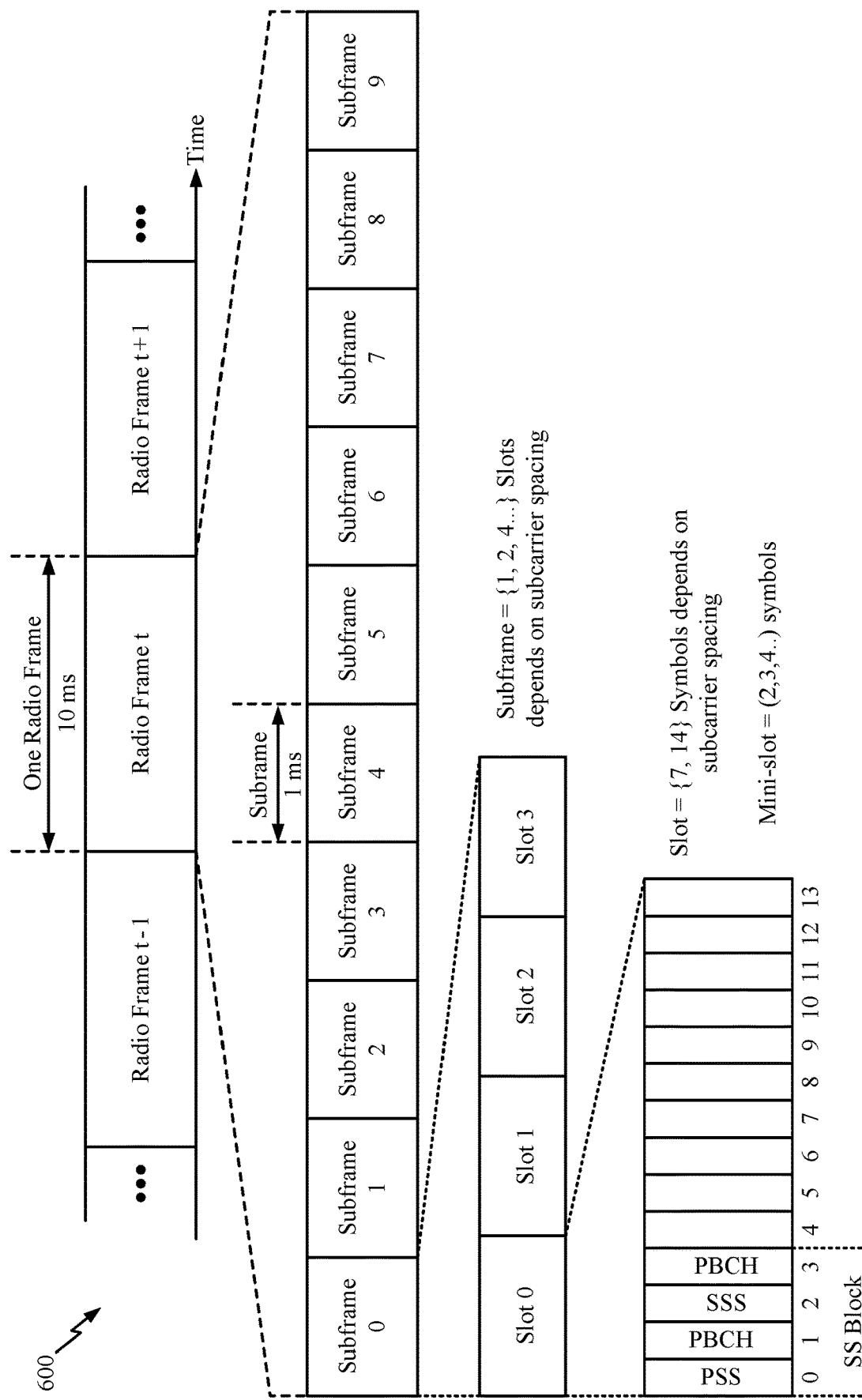
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, and SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In 5G-NR, the P1, P2, and P3 procedures are used for beam pair link (BPL) discovery and refinement. The network uses a P1 procedure to enable the discovery of new BPLs. In the P1 procedure, the BS transmits different symbols of a reference signal, each beam formed in a different spatial direction such that several (most, all) relevant places of the cell are reached. Stated otherwise, the BS transmits beams using different transmit beams over time in different directions. For successful reception of at least a symbol of this "P1-signal", the UE has to find an appropriate receive beam. It searches using available receive beams and applying a different UE-beam during each occurrence of the periodic P1-signal.

Once the UE has succeeded in receiving a symbol of the P1-signal it has discovered a BPL. The UE may not want to wait until it has found the best UE receive beam, because this may delay further actions. The UE may measure the reference signal receive power (RSRP) and report the symbol index together with the RSRP to the BS. Such a report will typically contain the findings of one or more BPLs. In an example, the UE may determine a received signal having a high RSRP. The UE may not know which beam the BS used to transmit; however, the UE may report to the BS the time at which it observed the signal having a high RSRP. The BS may receive this report and may determine which BS beam the BS used at the given time.

The BS may then offer P2 and P3 procedures to refine an individual BPL. The P2 procedure refines the BS-beam of a BPL. The BS may transmit a few symbols of a reference signal with different BS-beams that are spatially close to the BS-beam of the BPL (the BS performs a sweep using neighboring beams around the selected beam). In P2, the UE keeps its beam constant. Thus, while the UE uses the same beam as in the BPL (as illustrated in P2 procedure in FIG. 7). The BS-beams used for P2 may be different from those for P1 in that they may be spaced closer together or they may be more focused. The UE may measure the RSRP for the various BS-beams and indicate the best one to the BS. The P3 procedure refines the UE-beam of a BPL. While the BS-beam stays constant, the UE scans using different receive beams (the UE performs a sweep using neighboring beams). The UE may measure the RSRP of each beam and identify the best UE-beam. Afterwards, the UE may use the best UE beam for the BPL and report the RSRP to the BS.

Examples of Antenna Array Module Mode Adjustments

Figure 7:
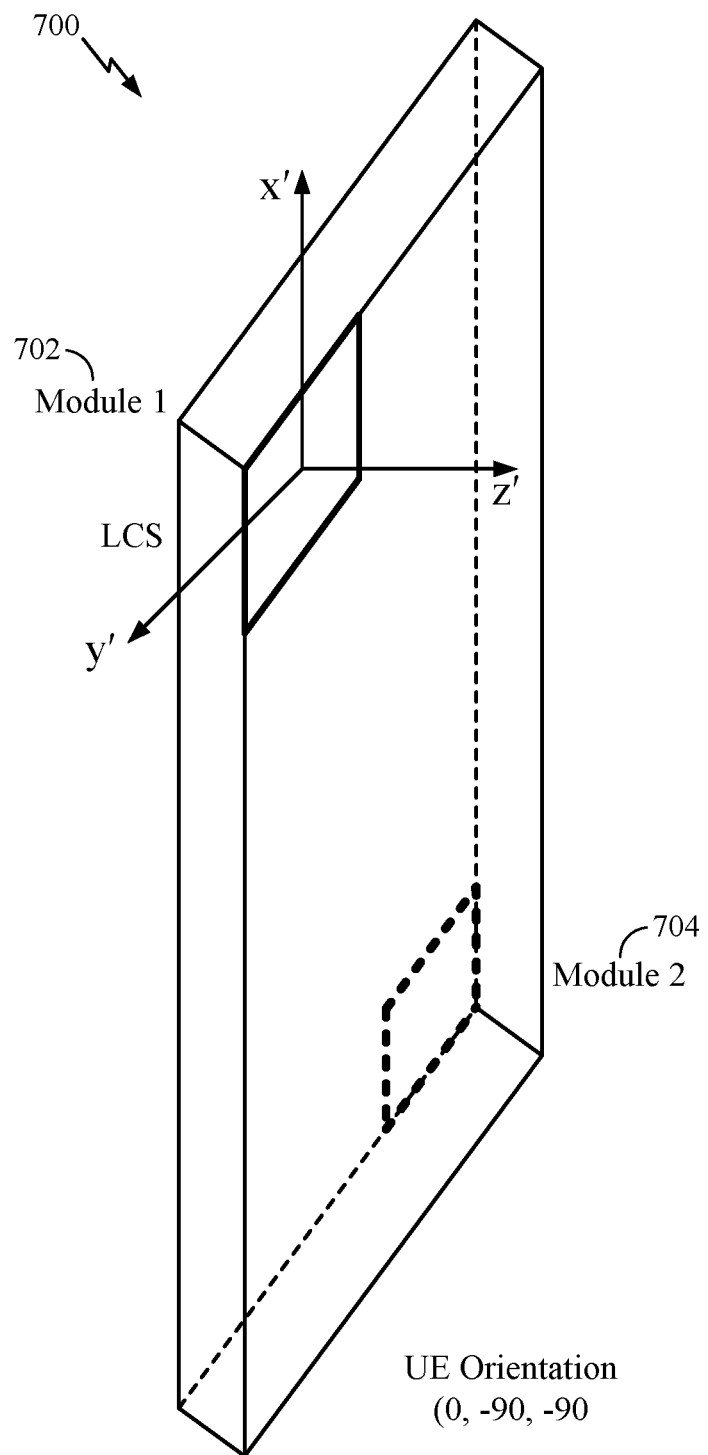
FIG. 7 illustrates an example of antenna array module placement on a UE, in accordance with aspects of the present disclosure.

A UE may have a number of different antenna array modules that may each be provided at different locations on or within the UE. The arrangement of each may also vary depending on the specific UE and the number, size, and other properties of each of the modules. An example of a UE and modules is shown in FIG. 7. Specifically, FIG. 7 illustrates an example of antenna array module placement on a UE 700, in accordance with aspects of the present disclosure. As shown in this embodiment, the UE 700 includes two modules 702 and 704. The first of the modules, labeled Module 1 (702), is shown located on a front surface of the UE 700 in the upper left corner of the device. Additionally, the second module, labeled Module 2 (704), is shown located on a back surface on a bottom right corner of the UE device 700.

To save power, a UE, such as the UE 700 shown in FIG. 7, may only keep one or some antenna array modules in wakeup (serving) mode, while keeping other antenna array modules in sleep mode. Beam switch latency within a wakeup module is typically short and predictable. For example, a beam switch latency may be around or less than 250 us from receiving DCI to beam switch finish. However, beam switch latency across wakeup and sleep modules depends on UE capability including for example symbol count, and sleep type, e.g. deep/light.

Figure 8:
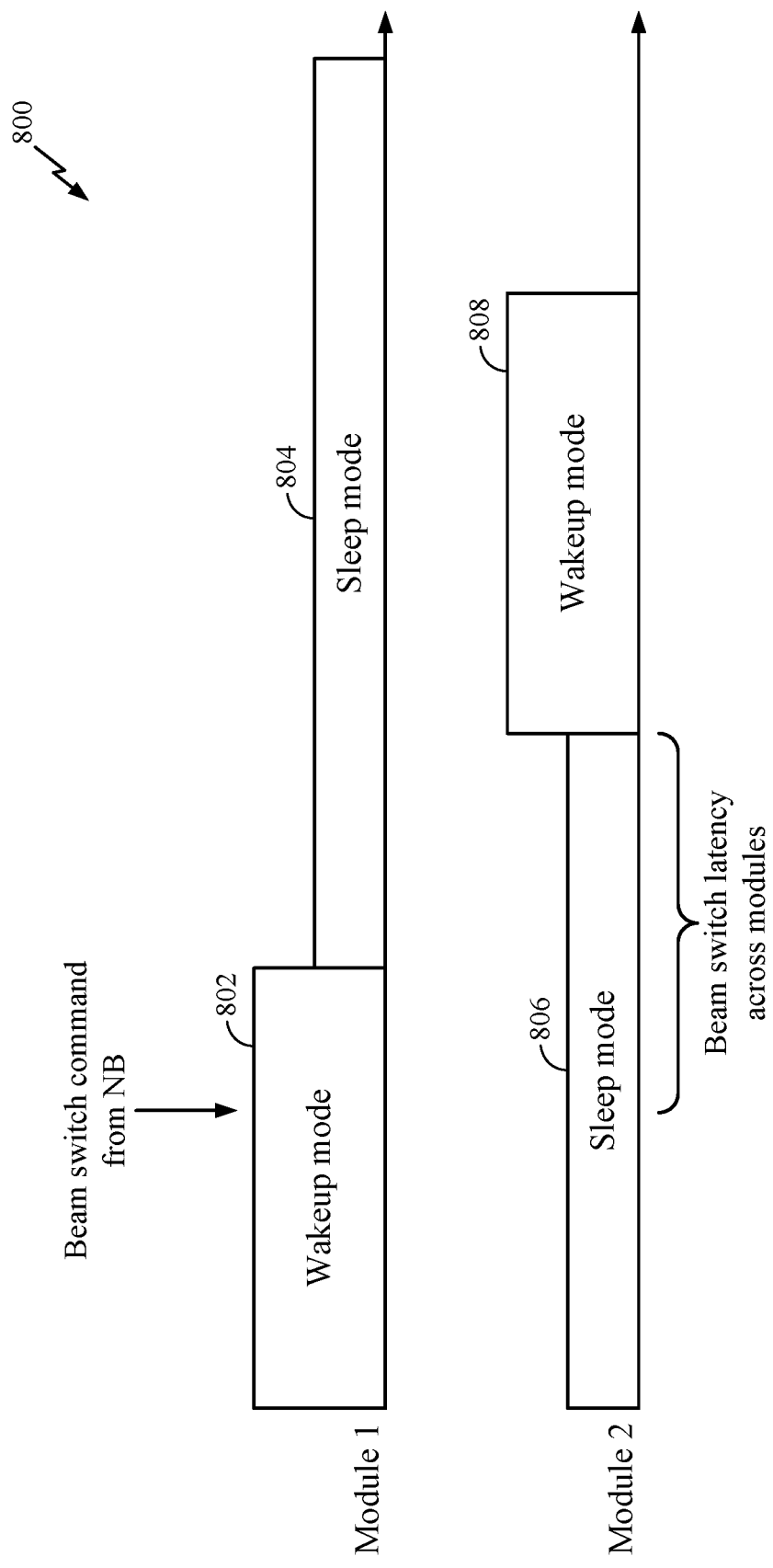
FIG. 8 illustrates an example of mode adjustments for antenna array modules over time, in accordance with aspects of the present disclosure.

An example of module mode switching and timing is shown in FIG. 8. Specifically, FIG. 8 illustrates an example of mode adjustments 800 for antenna array modules (Module 1 and Module 2) over time, in accordance with aspects of the present disclosure. As shown, Module 1 may begin in a wakeup mode 802 while module 2 may begin in a sleep mode 806. The module 1 may wake from the wakeup mode 802 and transition into a sleep mode 804 which may occur while module 2 is still in its sleep mode 806. The module 2 may then transition from the sleep mode 806 to a wakeup mode 808 as shown. Further, a beam switch command from an NB is shown being received at a time when the module 1 is in a wakeup mode 802 and the module 2 is in a sleep mode 806. Also indicated in FIG. 8 is an example of a beam switch latency across modules.

Thus, it can be appreciated that without UE feedback, an NB may find it difficult to know if the target module is in a sleep mode and therefore may find it difficult to know the corresponding beam switch time.

Example of Signaling of UE Intra/Inter-Panel Beam Switch Latency

In accordance with one or more aspects of embodiments described herein, options may be provided to signal UE intra/inter-panel beam switch for a number of different scenarios. For example, the scenarios may include, but are not limited to signaling of inter-module beam switch latency for P3 beam management (BM), dynamic switching control beams over activated transmission configuration indicator (TCI) states for PDCCH, or dynamic switching PDSCH beams from a given PDCCH beam (one CORESET).

Figure 9:
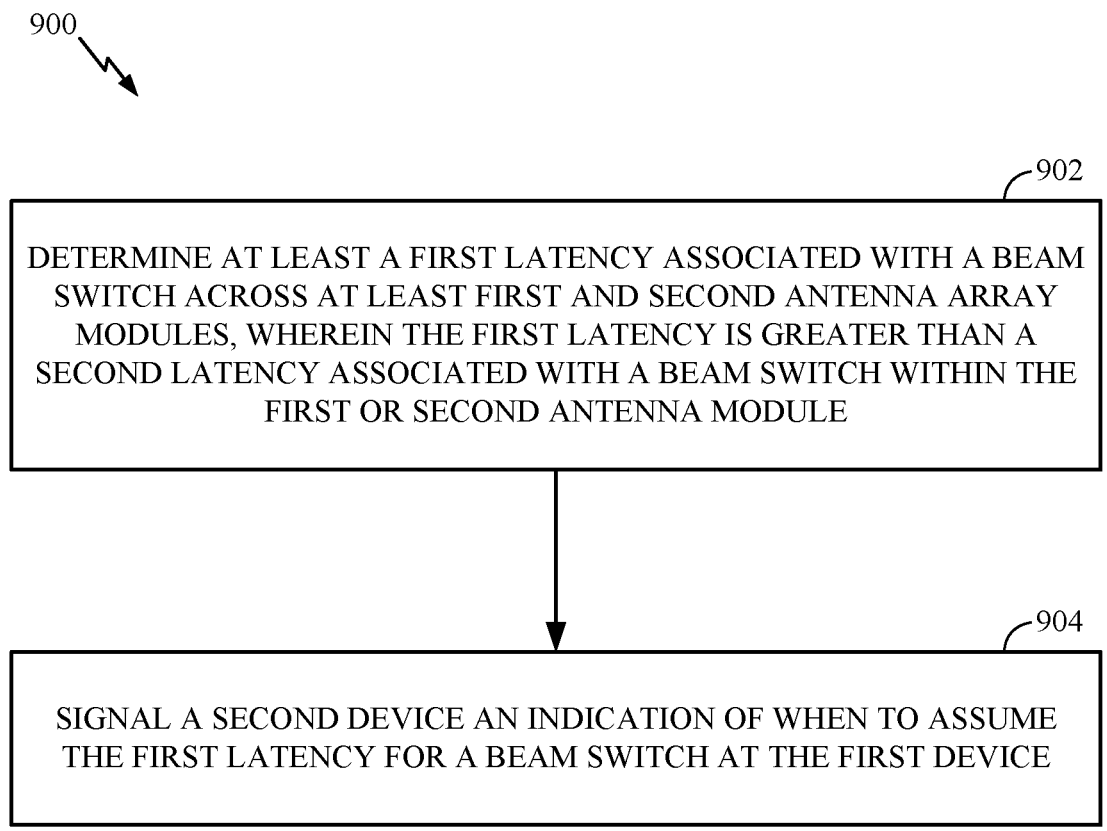
FIG. 9 illustrates example operations for wireless communications by a user equipment (UE), in accordance with aspects of the present disclosure.

FIG. 9 illustrates operations 900 for wireless communications that may be performed by a first device, such as a user equipment (UE), in accordance with aspects of the present disclosure.

Operations 900 begin, at 902, by determining at least a first latency associated with a beam switch across at least first and second antenna array modules, wherein the first latency is greater than or equal to a second latency associated with a beam switch within the first or second antenna module. Operations 900 further include, at 904, signaling a second device an indication of when to assume the first latency for a beam switch at the first device.

Figure 10:
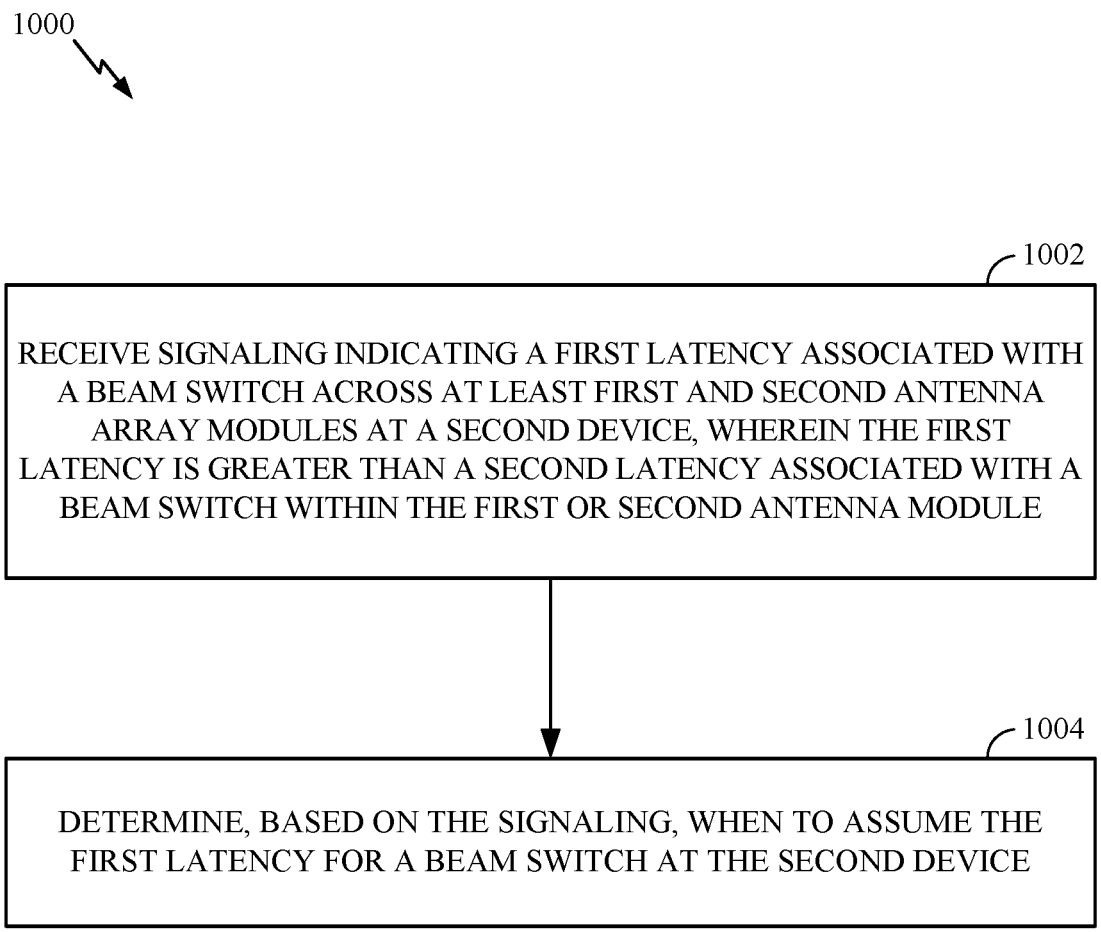
FIG. 10 illustrates example operations for wireless communications by a network entity, in accordance with aspects of the present disclosure.

FIG. 10 illustrates operations 1000 for wireless communications that may be performed by a first device (e.g., a network entity such as a gNB), in accordance with aspects of the present disclosure.

Operations 1000 begin, at 1002, by receiving signaling indicating a first latency associated with a beam switch across at least first and second antenna array modules at a second device, wherein the first latency is greater than or equal to a second latency associated with a beam switch within the first or second antenna module. At 1004, the operations may further include determining, based on the signaling, when to assume the first latency for a beam switch at the second device.

Figure 11:
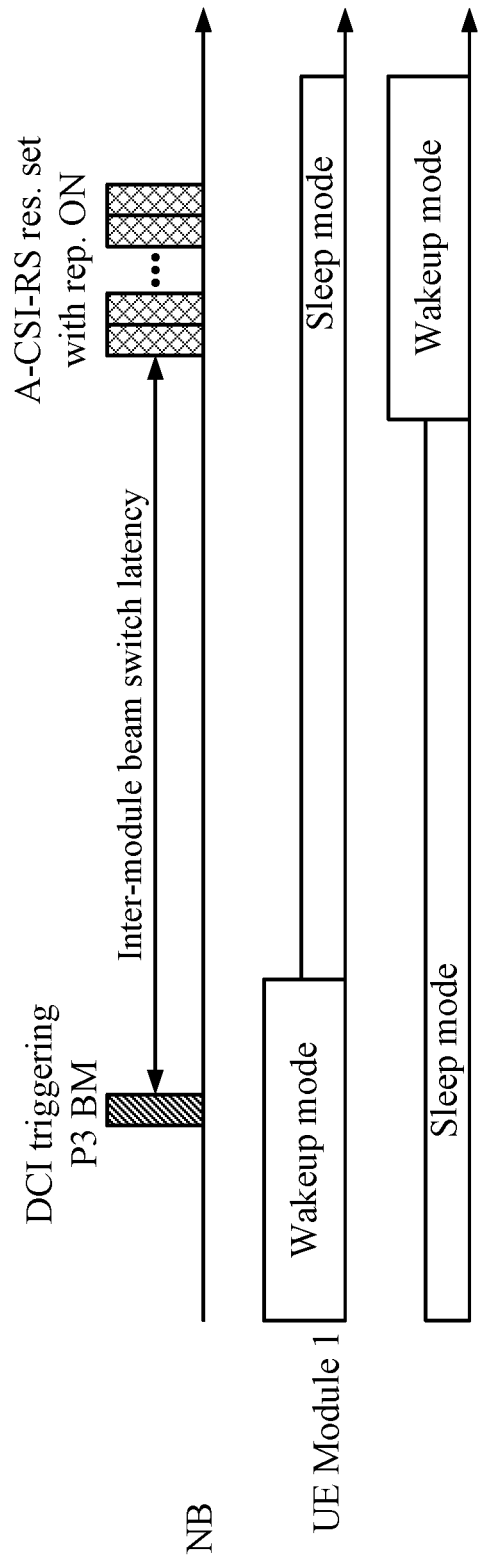
FIG. 11 illustrates an example of signaling of inter-module beam switch latency for P3 beam management (BM), in accordance with aspects of the present disclosure.

In accordance with one or more aspects of embodiments described herein, a number of different options may be provided to signal inter-module BS latency for P3 BM. In some cases, a first option may be provided where the UE signals a fixed beam switch latency for P3 BM as shown in FIG. 11. The UE capability may indicate a single fixed latency for P3 BM, e.g. 2 ms. In some cases, the NB may use this value for all P3 BM. In some cases, the NB may not be able to tell an intra-module beam switch from an inter-module beam switch.

Figure 12:
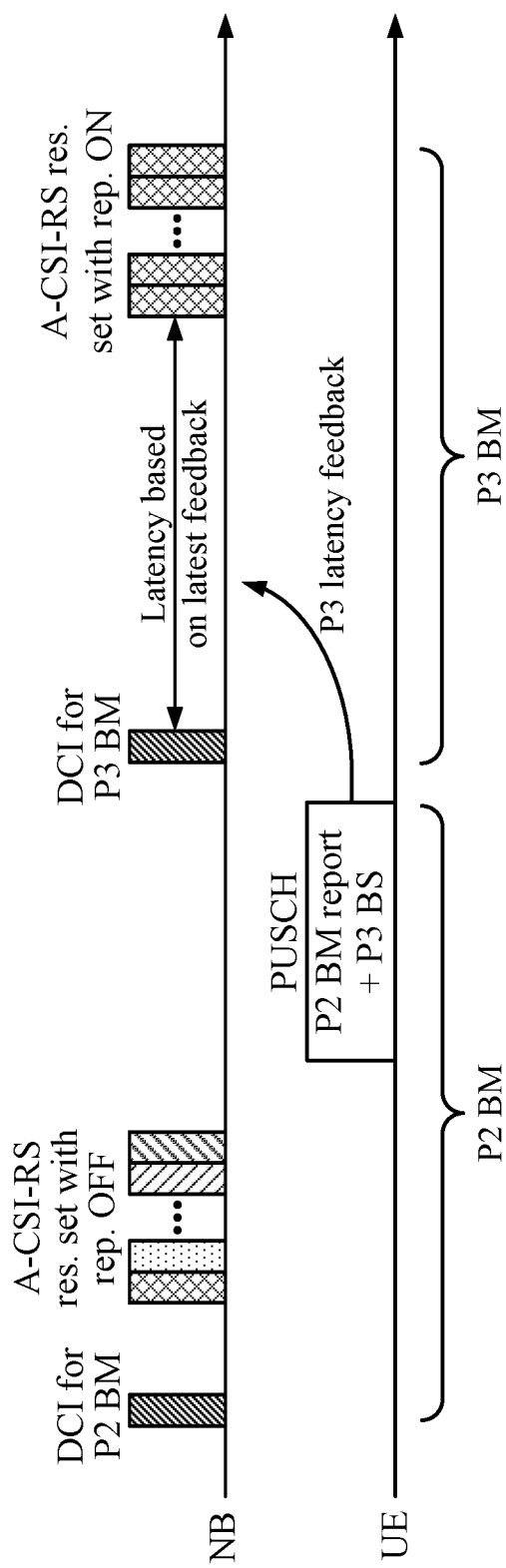
FIG. 12 illustrates an example of signaling of inter-module beam switch latency for P3 BM, in accordance with aspects of the present disclosure.

In some cases, another option to signal inter-module beam switch latency for P3 BM may include a UE that signals a configurable BS latency for P3 BM. The UE may indicate a single configurable latency for P3 BM, e.g. via MAC-CE. Specifically, the UE may update P3 latency in MAC-CE in PUSCH carrying P2 BM report. The NB may then use the latest reported latency value for all following P3 BM. An example of this option for signaling of inter-module beam switch latency for P3 BM is shown in FIG. 12. The UE may also update P3 latency in uplink control information (UCI) field in PUCCH carrying P2 BM report.

In some cases, another option for signaling of inter-module beam switch latency for P3 BM, as shown in FIG. 13, may be provided. As shown, this option may include a trial and error approach. Particularly, an NB may first blindly send an A-CSI-RS for P3 with either intra or inter-module BS latency. A UE may then respond with feedback, if A-CSI-RS is received, that include a timely ACK/NACK in PUCCH. If the NB receives a NACK from the UE, the NB may send A-CSI-RS again with a different latency as shown.

In some cases, another option for signaling of inter-module beam switch latency for P3 BM, as shown in FIG. 14, may be provided. As shown, this option may include an NB that sends a A-CSI-RS for P3 with both intra and inter-module BS latencies. In some cases, a UE may therefore surely get one A-CSI-RS regardless of whether the target module is in a wakeup or sleep mode.

In accordance with one or more aspects of embodiments described herein, a number of different options may provide dynamic switching control beams over activated TCI States for PDCCH.

Figure 15:
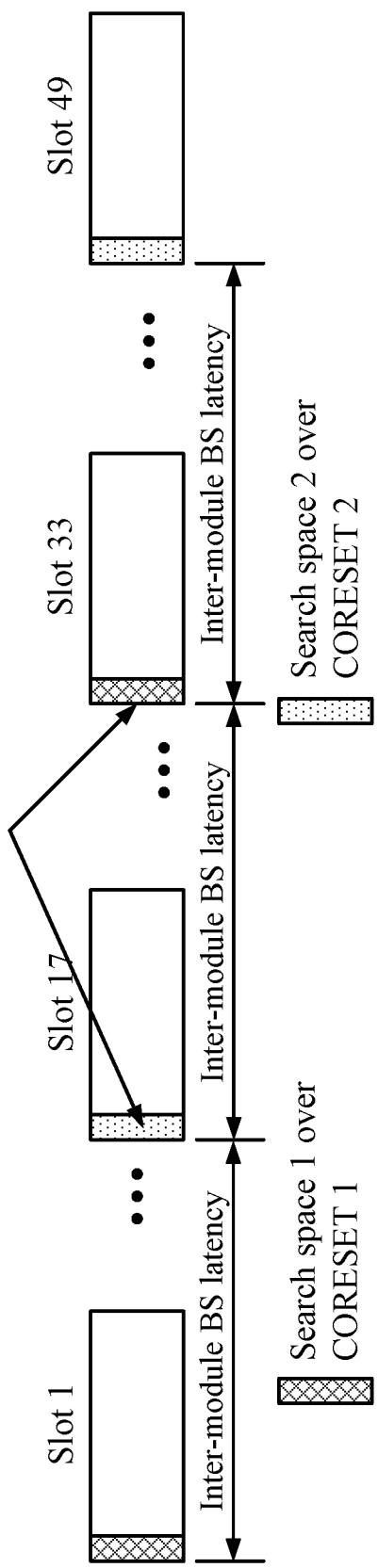
FIG. 15 illustrates an example of dynamic switching control beams over activated transmission configuration indicator (TCI) States for PDCCH, in accordance with aspects of the present disclosure.

In some cases, an option may be provided to signal an inter-module latency for a PDCCH beam switch. Particularly, to achieve an inter-module PDCCH beam switch, an NB may define a number of sets (X sets) of PDCCH search spaces that may be staggered with offset greater than the inter-module BS latency as shown, for example, in FIG. 15. Each search space may be associated with a CORESET ID, corresponding to a particular PDCCH beam. In one or more cases, a UE may wake up different modules in different search spaces in TDM fashion to receive PDCCH with cross-module Rx beams. In some cases, a UE may need to signal PDCCH inter-module BS latency to a NB, which therefore can stagger search spaces accordingly. Otherwise, in some cases, an NB may use intra-module BS latency as a default.

In some cases, an option may be provided to signal Intra and inter-module latency for PDCCH BS. Particularly, to achieve mixed intra/inter-module PDCCH beam switches, a UE may need to signal if the BS latency is intra/inter-module between any two CORESET TCI states to an NB, which therefore can stagger the search spaces accordingly. In some cases, for example, a first search space and a second search space may have intra-module PDCCH beam switch and, hence, have offset equal to intra-module PDCCH BS latency. In some cases, for example, the second search space and a third search space may have inter-module PDCCH beam switch and, hence, have offset equal to inter-module PDCCH BS latency. In some cases, if a UE has to monitor multiple CORESETs per slot requiring inter-module PDCCH beam switches, the UE may have to use only one active module to try to decode those CORESETs and scheduled contents.

In accordance with one or more aspects of embodiments described herein, a number of different options may provide dynamic switching PDSCH beams from a given PDCCH Beam (one CORESET).

In some cases, an option may be provided for using PDCCH Beam as a reference. Particularly, using a given PDCCH beam (which may be referred to as an anchor beam) as a reference to signal each possible switch from PDCCH beam to a possible PDSCH beam may use intra or inter-module beam switch latency.

Figure 16:
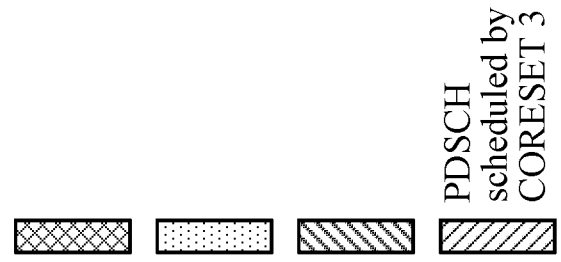
FIG. 16 illustrates an example of dynamic switching PDSCH beams from a given PDCCH beam (one CORESET), in accordance with aspects of the present disclosure.
Figure 16:
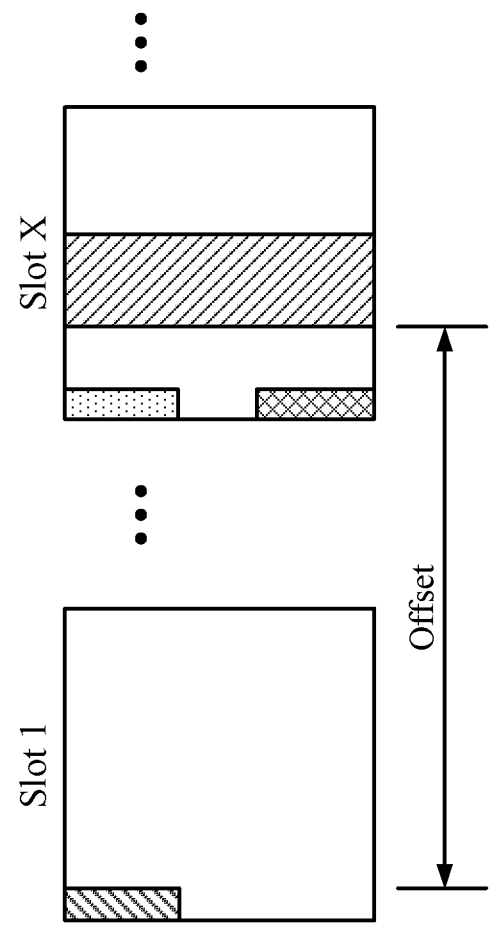

An anchor beam for PDSCH may be defined in accordance with a number of different factors. In some cases, an offset between scheduling DCI and PDSCH may be greater than or equal to a threshold Threshold-Sched-Offset and the parameter TCI-PresentInDCI is set as 'Enabled' for the CORESET scheduling the PDSCH. If this is the case, an anchor beam for this PDSCH may be the one Txing/Rxing the scheduling CORESET at NB/UE as shown in FIG. 16. Specifically, the solid block in the upper left corner of Slot 1 that corresponds to CORESET 3 as shown in FIG. 16 may be the anchor beam. Otherwise, if the above is not the case, an anchor beam may be the one Txing/Rxing the CORESET with lowest ID in latest slot, where at least 1 CORESET is configured for the UE as shown in FIG. 16. Particularly, the solid block in the lower left corner of Slot X that corresponds to CORESET 1 may be the anchor beam.

In some cases, a PDSCH Beam Switch Duration may be defined based on one or more factors. In some cases, PDSCH beam switch duration is defined as offset between CORESET for above identified anchor beam and the PDSCH. NB scheduling may need to ensure the beam switch duration is greater than or equal to corresponding required beam switch latency if the switch from anchor beam to PDSCH beam is intra/inter-module at UE. To achieve this, a UE may need to inform the NB the required intra/inter-module beam switch latency, as well as every possible switch from one anchor beam to one PDSCH beam, is intra/inter-module beam switch.

In some cases, a signal latency type per possible PDSCH beam switch may be provided. Beam indication is provided in Rel-15 specification. Beam indication may include an NB that configures a UE such that X CORESETs per bandwidth part (BWP) is provided where X is less than or equal to three. The UE may identify an anchor beam per CORESET based on its used TCI state, indicated by NB via MAC-CE or RRC. In some cases, an NB configures a UE via MAC-CE such that the Y PDSCH active TCI states per BWP are provided where Y is less than or equal to eight. The UE may identify a PDSCH beam per active TCI state.

In some cases, informing an NB every possible switch from one anchor beam to one PDSCH beam may be intra/inter-module beam switch. In some cases, a UE may signal the X-by-Y matrix as shown in the table of FIG. 17 to the NB, where each bit indicates corresponding beam switch is intra/inter-module. In some cases, the number of column for the table shown in FIG. 17 may be reduced to Y−1, because CORESET TCI state is one of the Y active TCI states, and the corresponding beam switch from the CORESET TCI state to the identical PDSCH active TCI state means the PDCCH beam is same as PDSCH beam and hence no need to signal corresponding latency.

In some cases, a signal latency type per possible PDSCH beam switch may be provided. A UE may need to update an NB of any change in the matrix shown in FIG. 17. For example, when CORESET TCI state is reconfigured, a UE may signal an NB at least the corresponding row. In some cases, for example, when a new PDSCH active TCI state is added, a UE may signal an NB at least the corresponding column. In some cases, for example, when PDSCH beam for an active TCI state is updated due to channel variation, e.g. in P3 beam refinement, a UE may signal an NB at least the corresponding entry.

In some cases, the update can be carried in MAC-CE in PUSCH or UCI in PUCCH. The update may be sent in the ACK to NB's MAC-CE or RRC message for TCI state reconfiguration if the ACK has room. Otherwise, in some cases, additional UL resource may be needed to get the feedback.

In some cases, using a serving beam before a report as a reference may be provided. The serving beam includes the PDSCH beam. This may include defining two switching delays (corresponding to intra-panel and inter-panel) and when a UE reports the beams for beam management another bit may be added per reported beam to signal the delay for switching from the current serving beam to the reported beam. This may require that the serving beam only changes after each BM report and remains fixed until a next BM report is received, so the 1-bit latency indicator can use this fixed serving beam as reference to signal if each reported beam is intra or inter panel switch.

Figure 18:
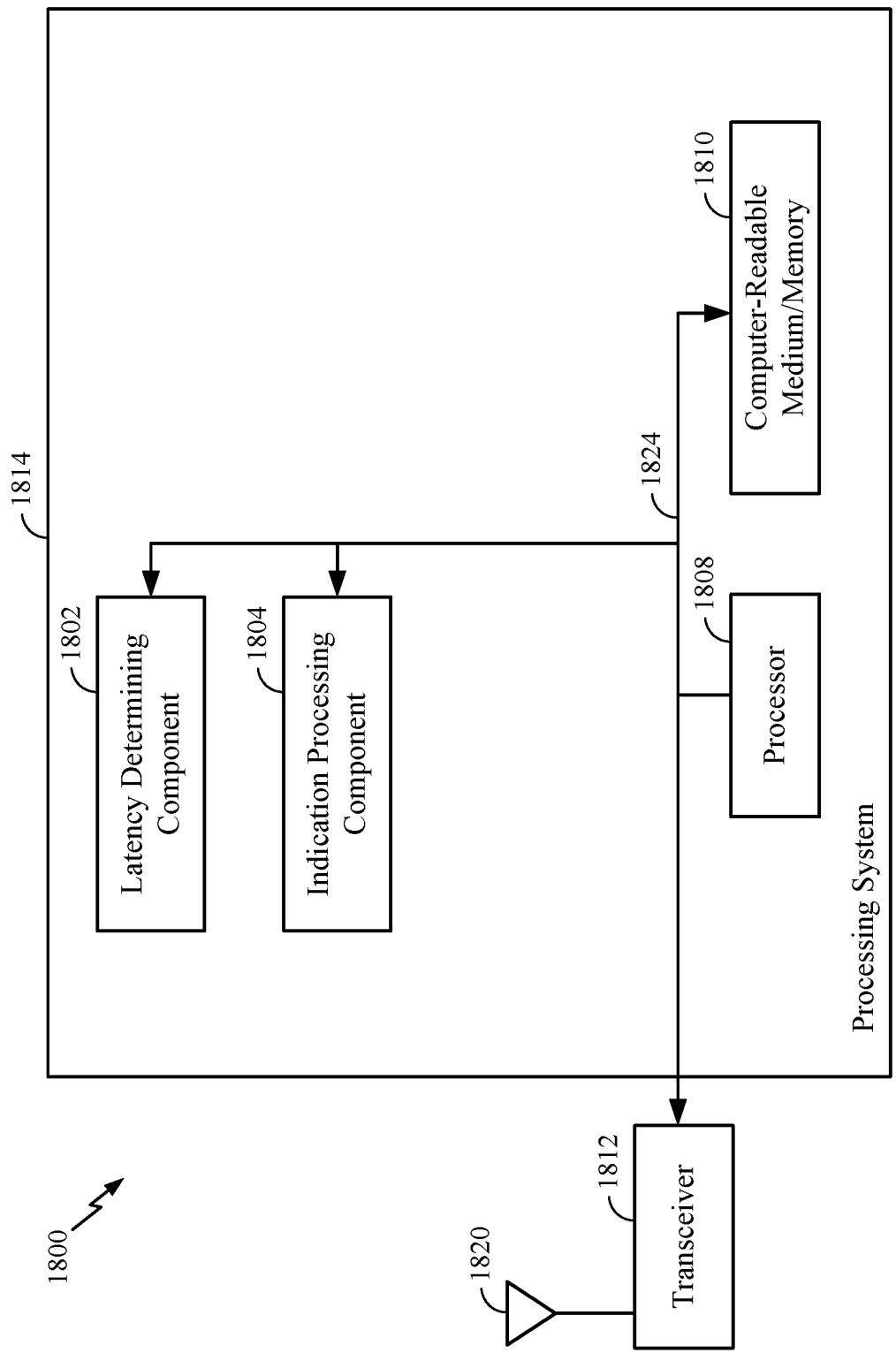
FIG. 18 illustrates a communications device that includes components capable of performing techniques described herein.

FIG. 18 illustrates a communications device 1800 that includes components (e.g., corresponding to means-plus-function components) capable of performing operations for the techniques described herein, such as the operations 900 illustrated in FIG. 9. The communications device 1800 includes a processing system 1814 coupled to a transceiver 1812. The transceiver 1812 is configured to transmit and receive signals for the communications device 1800 via an antenna 1820, such as the various signal described herein. The processing system 1814 may be configured to perform processing functions for the communications device 1800, including processing signals received and/or to be transmitted by the communications device 1800.

The processing system 1814 includes a processor 1808 coupled to a computer-readable medium/memory 1810 via a bus 1824. In certain aspects, the computer-readable medium/memory 1810 is configured to store instructions that when executed by processor 1808, cause the processor 1808 to perform the operations illustrated in FIG. 9, or other operations for performing the various techniques discussed herein. In certain aspects, the processing system 1814 further includes a latency determining component 1802 for performing the operations illustrated at 902 in FIG. 9. The processing system 1814 also includes an indication processing component 1804 for performing the operations illustrated at 904 in FIG. 9.

The latency determining component 1802 and indication processing component 1804 may be coupled to the processor 1808 via bus 1824. In certain aspects, the latency determining component 1802 and indication processing component 1804 may be hardware circuits. In certain aspects, the latency determining component 1802 and indication processing component 1804 may be software components that are executed and run on processor 1808.

Figure 19:
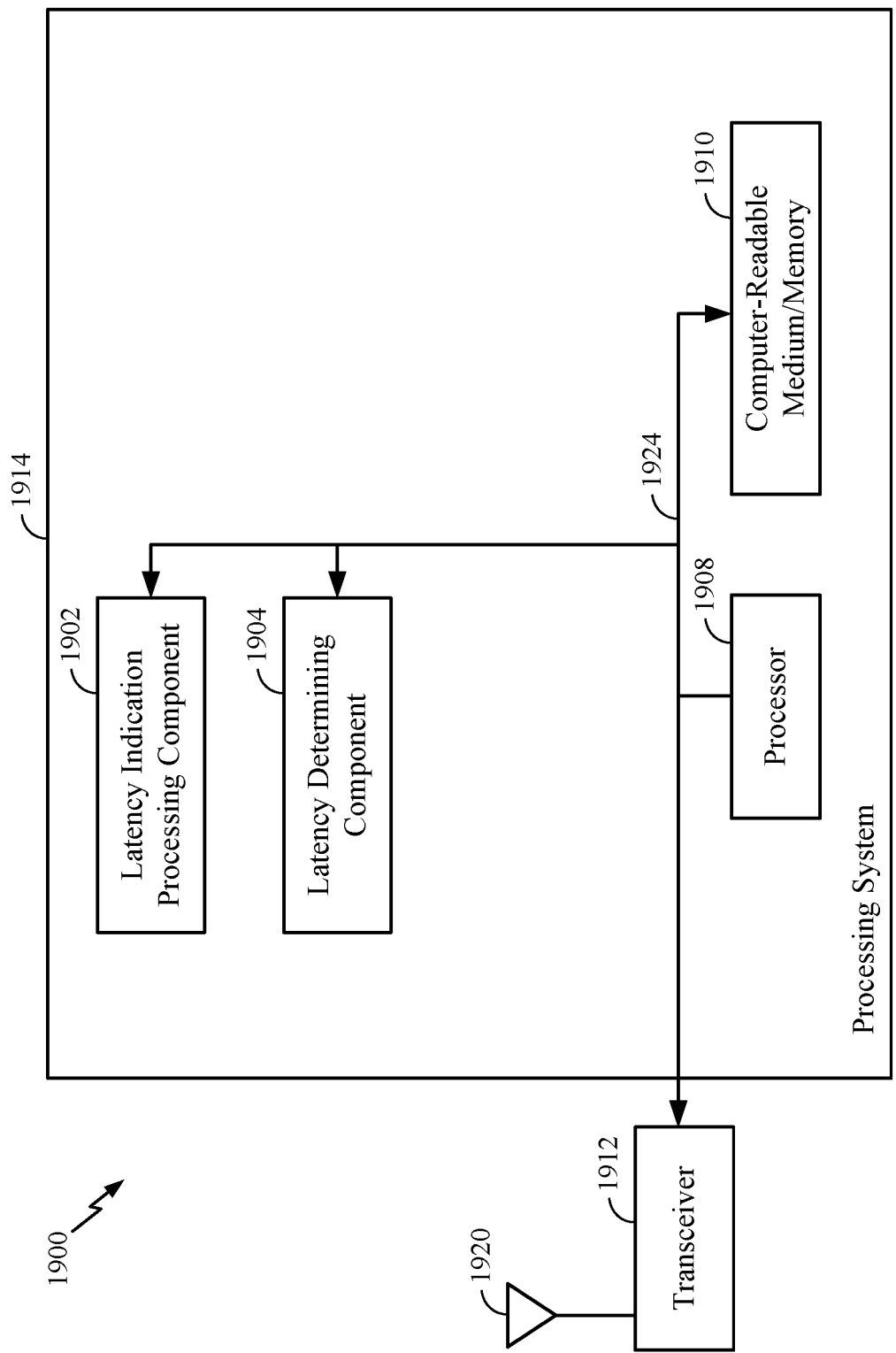
FIG. 19 illustrates a communications device that includes components capable of performing techniques described herein.

FIG. 19 illustrates a communications device 1900 that includes components (e.g., corresponding to means-plus-function components) capable of performing operations for the techniques described herein, such as the operations 1000 illustrated in FIG. 10. The communications device 1900 includes a processing system 1914 coupled to a transceiver 1912. The transceiver 1912 is configured to transmit and receive signals for the communications device 1900 via an antenna 1920, such as the various signal described herein. The processing system 1914 may be configured to perform processing functions for the communications device 1900, including processing signals received and/or to be transmitted by the communications device 1900.

The processing system 1914 includes a processor 1908 coupled to a computer-readable medium/memory 1910 via a bus 1924. In certain aspects, the computer-readable medium/memory 1910 is configured to store instructions that when executed by processor 1908, cause the processor 1908 to perform the operations illustrated in FIG. 10, or other operations for performing the various techniques discussed herein. In certain aspects, the processing system 1914 further includes a latency indication processing component 1902 for performing the operations illustrated at 1002 in FIG. 10. The processing system 1914 also includes a latency determining component 1904 for performing the operations illustrated at 1004 in FIG. 10.

The latency indication processing component 1902 and latency determining component 1904 may be coupled to the processor 1908 via bus 1924. In certain aspects, the latency indication processing component 1902 and latency determining component 1904 may be hardware circuits. In certain aspects, the latency indication processing component 1902 and latency determining component 1904 may be software components that are executed and run on processor 1908.

In one or more cases, a method for wireless communications by a first device may be provided. The method may comprise receiving signaling indicating a first latency associated with a beam switch across at least first and second antenna array modules at a second device, wherein the first latency is greater than or equal to a second latency associated with a beam switch within the first or second antenna module. The method may further comprise determining, based on the signaling, when to assume the first latency for a beam switch at the second device. In some cases, the second device includes a user equipment (UE), and the first device includes a base station (BS). In some cases, the beam switch may include reception beam switch in downlink receiving signal from the second device, or the beam switch may include transmission beam switch in uplink transmitting signal to the second device.

In some cases, the signaling may indicate, to the first device, when to use the first latency during a beam management procedure during which the first device scans different receive beams. The different receive beams may receive CSI-RS resources sent by same transmit beam in a CSI-RS resource set scheduled by a DCI, and the beam switch latency refers to the time between DCI and scheduled CSI-RS resource set. The signaling may comprise indicating a fixed first latency the first device should assume at least for all cross-module beam switches.

In some cases, the signaling may comprise indicating a configurable first latency the first device should assume for cross-module beam switches. The method may further comprise receiving an updated first latency the first device should assume for cross-module beam switches. The updated first latency may be signaled via a physical uplink shared channel (PUSCH) carrying results of a beam management procedure during which the second device scans different transmit beams. The updated first latency may be signaled via at least one of a physical uplink shared channel (PUSCH), a MAC control element (MAC-CE) in PUSCH, a physical uplink control channel (PUCCH), or an uplink control information (UCI) field in PUSCH.

In some cases, the first device sends a channel state information reference signal (CSI-RS) transmission based on the second latency. In some cases, the signaling comprises a negatively acknowledgment of a channel state information reference signal (CSI-RS) transmission as an indication the first device should re-send the CSI-RS transmission based on the first latency. In some cases, the first device sends a channel state information reference signal (CSI-RS) transmissions based on both the first latency and the second latency.

In some cases, the first device staggers physical downlink control channel (PDCCH) search spaces, wherein each search space is associated with a control resource set (CORESET) ID and a particular PDCCH beam. In some cases, the second device activates different antenna array modules at different times to monitor for PDCCH transmissions in the different search spaces. The first device may stagger the search space with an offset greater than the first latency. The signaling may indicate if the first device should use the first latency or second latency for beam switches between any two CORESET transmission configuration indicator (TCI) states when staggering the search spaces accordingly.

In some cases, the signaling indicates, for possible switches from a physical downlink control channel (PDCCH) beam to a physical downlink shared channel (PDSCH) beam, whether the first device should use the first or second latency. The first device may configure the second device with a plurality of control resource sets (CORESETs). The signaling may indicate, for each CORESET, an anchor beam for the first device to use as a reference when deciding whether to use the first or second latency. Each anchor beam may be determined based on a transmission configuration indication (TCI) state. The first device may configure the second device with a plurality of active TCI states; and each PDSCH beam is determined based on an active TCI state. The second device signals in indication, for each CORESET and active TCI state, whether the second device switches from an anchor beam to a PDSCH beam by using the first or second latency. In some cases, the signaling is provided when the second device reports one or more beams for beam management, and the signaling is provided via a bit per reported beam, indicating whether the first device should use the first or second latency when switching from current beam to the reported beam.

The methods described herein comprise one or more steps or actions for achieving the described method or operation of wireless communications. A method step and/or action may be interchanged with one another, or removed or skipped, without departing from the scope of the claims. Unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 9A:
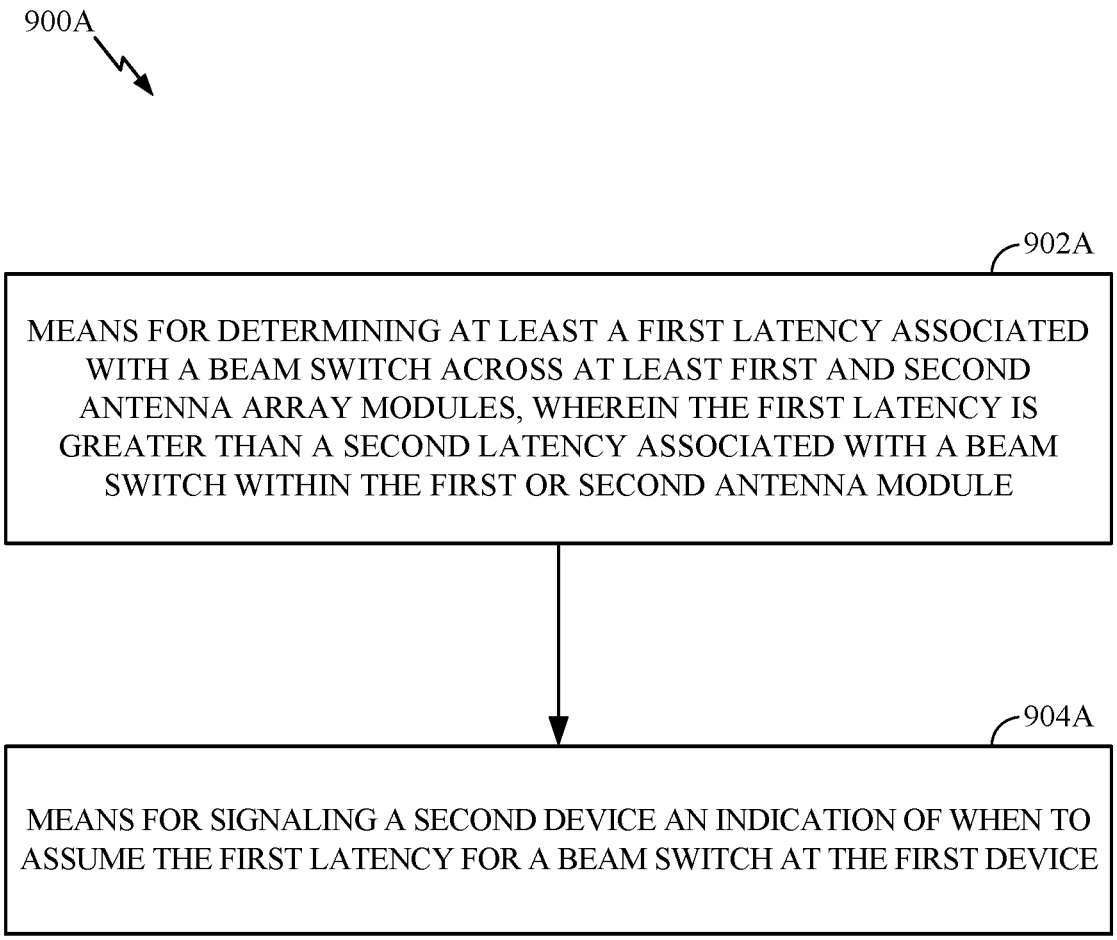
FIG. 9A illustrates example components capable of performing the operations shown in FIG. 9.
Figure 10A:
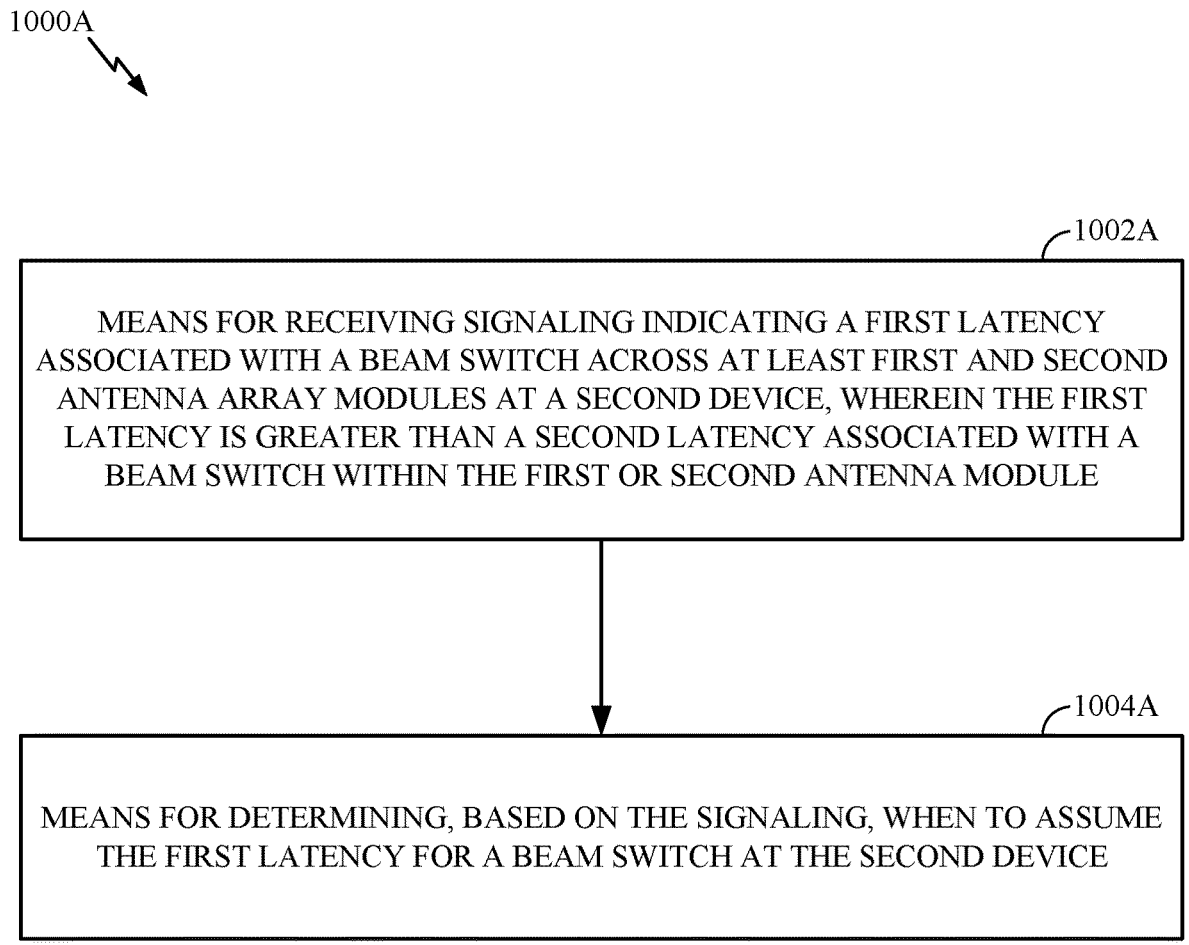
FIG. 10A illustrates example components capable of performing the operations shown in FIG. 10.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 900 illustrated in FIG. 9, and operations 1000 illustrated in FIG. 10, correspond to means 900A illustrated in FIG. 9A, means 1000A illustrated in FIG. 10A, respectively.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for signaling, means for performing, means for indicating, means for carrying, means for acknowledging, means for staggering, means for deciding, means for using, means for switching, and/or means for indicting may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a first device, comprising:
transmitting, from the first device to a second device, a first indication of first device's capability associated with beam switch latency, wherein the first indication includes a first beam switch latency;
receiving, from the second device, a second indication triggering communication of one or more reference signals, wherein the second indication comprises a downlink control information (DCI), and the one or more reference signals comprise one or more aperiodic channel state information reference signals (A-CSI-RSs); and
receiving, from the second device, the one or more reference signals after receiving the second indication, wherein a delay between receiving the second indication and the one or more reference signals is based on the first beam switch latency, wherein the first beam switch latency indicates a delay between the DCI and the one or more A-CSI-RSs.

2. The method of claim 1, wherein the first device includes a user equipment (UE), and wherein the second device includes a base station (BS).

3. The method of claim 1, wherein
the beam switch includes reception beam switch in downlink receiving signal from the second device, or
the beam switch includes transmission beam switch in uplink transmitting signal to the second device.

4. The method of claim 1, wherein the received one or more A-CSI-RSs are part of a P3 beam management.

5. The method of claim 4, wherein the received one or more A-CSI-RSs scheduled by the DCI.

6. The method of claim 4, wherein the first beam switch latency is fixed beam switch latency.

7. The method of claim 4, wherein the first beam switch latency is configurable beam switch latency.

8. The method of claim 5, wherein:
the second device configures the first device with a plurality of active TCI states; and each PDSCH beam is determined based on an active TCI state.

9. A method for wireless communications by a second device, comprising:
receiving, from a first device, a first indication of first device's capability associated with beam switch latency, wherein the first indication includes a first beam switch latency;
transmitting, from the second device to the first device, a second indication triggering communication of one or more reference signals, wherein the second indication comprises a downlink control information (DCI), and the one or more reference signals comprise one or more aperiodic channel state information reference signals (A-CSI-RSs); and
transmitting, from the second device to the first device, the one or more reference signals after transmitting the second indication, wherein a delay between transmitting the second indication and the one or more reference signals is based on the first beam switch latency, wherein the first beam switch latency indicates a delay between the DCI and the one or more A-CSI-RSs.

10. The method of claim 9, wherein the first device includes a user equipment (UE), and wherein the second device includes a base station (BS).

11. The method of claim 9, wherein:
the beam switch includes reception beam switch in downlink receiving signal from the second device, or
the beam switch includes transmission beam switch in uplink transmitting signal to the second device.

12. The method of claim 9, wherein the transmitted one or more A-CSI-RSs are part of a P3 beam management.

13. The method of claim 12, wherein the transmitted one or more A-CSI-RSs scheduled by the DCI.

14. The method of claim 12, wherein the first beam switch latency is fixed beam switch latency.

15. The method of claim 12, wherein the first beam switch latency is configurable beam switch latency.

16. An apparatus for wireless communications by a first device, comprising:
at least one processor configured to:
transmit, from the first device to a second device, a first indication of first device's capability associated with beam switch latency, wherein the first indication includes a first beam switch latency;
receive, from the second device, a second indication triggering communication of one or more reference signals, wherein the second indication comprises a downlink control information (DCI), and the one or more reference signals comprise one or more aperiodic channel state information reference signals (A-CSI-RSs); and
receive, from the second device, the one or more reference signals after receiving the second indication, wherein a delay between receiving the second indication and the one or more reference signals is based on the first beam switch latency, wherein the first beam switch latency indicates a delay between the DCI and the one or more A-CSI-RSs; and a memory coupled to the at least one processor.

17. An apparatus for wireless communications by a second device, comprising:

at least one processor configured to:

receive, from a first device, a first indication of first device's capability associated with beam switch latency, wherein the first indication includes a first beam switch latency;

transmit, from the second device to the first device, a second indication triggering communication of one or more reference signals, wherein the second indication comprises a downlink control information (DCI), and the one or more reference signals comprise one or more aperiodic channel state information reference signals (A-CSI-RSs); and transmit, from the second device to the first device, the one or more reference signals after transmitting the second indication, wherein a delay between transmitting the second indication and the one or more reference signals is based on the first beam switch latency, wherein the first beam switch latency indicates a delay between the DCI and the one or more A-CSI-RSs; and a memory coupled to the at least one processor.

18. The apparatus of claim 16, wherein the first device includes a user equipment (UE), and wherein the second device includes a base station (BS).

19. The apparatus of claim 16, wherein the beam switch includes reception beam switch in downlink receiving signal from the second device, or the beam switch includes transmission beam switch in uplink transmitting signal to the second device.

20. The apparatus of claim 16, wherein the received one or more A-CSI-RSs are part of a P3 beam management.

21. The apparatus of claim 20, wherein the received one or more A-CSI-RSs scheduled by the DCI.

22. The apparatus of claim 20, wherein the first beam switch latency is fixed beam switch latency.

23. The apparatus of claim 20, wherein the first beam switch latency is configurable beam switch latency.

24. The apparatus of claim 17, wherein the first device includes a user equipment (UE), and wherein the second device includes a base station (BS).

25. The apparatus of claim 17, wherein the beam switch includes reception beam switch in downlink receiving signal from the second device, or the beam switch includes transmission beam switch in uplink transmitting signal to the second device.

26. The apparatus of claim 17, wherein the received one or more A-CSI-RSs are part of a P3 beam management.

27. The apparatus of claim 26, wherein the received one or more A-CSI-RSs scheduled by the DCI.

28. The apparatus of claim 26, wherein the first beam switch latency is fixed beam switch latency.

29. The apparatus of claim 26, wherein the first beam switch latency is configurable beam switch latency.

* * * * *